No. 781,244. Patented January 31, 1905.

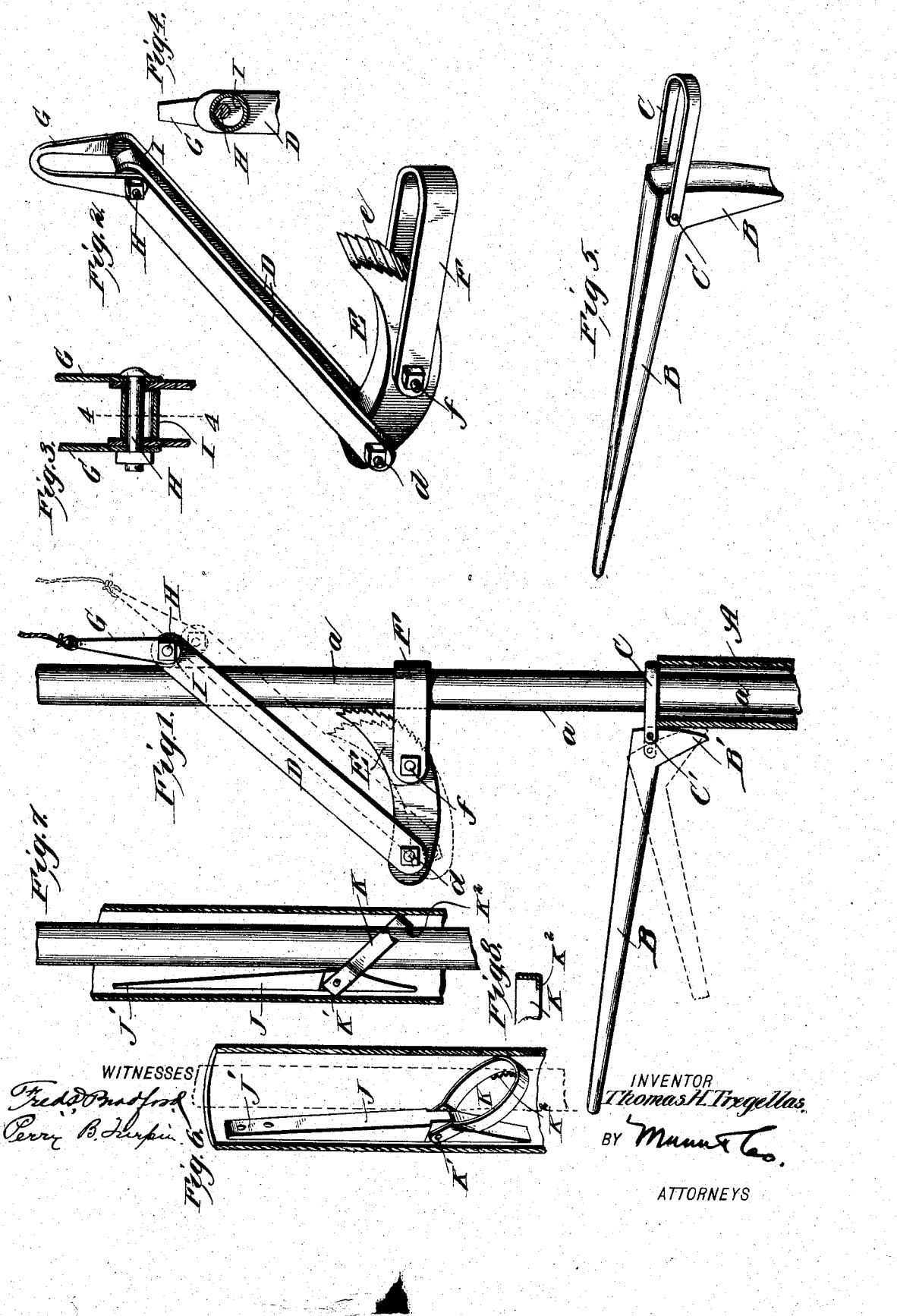

UNITED STATES PATENT OFFICE.

THOMAS HENRY TREGELLAS, OF IUKA, KANSAS.

PUMP-ROD LIFTER.

SPECIFICATION forming part of Letters Patent No. 781,244, dated January 31, 1905.

Application filed February 17, 1904. Serial No. 193,964.

*To all whom it may concern:*

Be it known that I, THOMAS HENRY TREGELLAS, a citizen of the United States, and a resident of Iuka, in the county of Pratt and State of Kansas, have made certain new and useful Improvements in Pump-Rod Lifters, of which the following is a specification.

My invention is an improvement in devices for use in pulling rods from wells; and it consists in certain novel constructions and combinations of parts, as will be hereinafter described and claimed.

In the drawings, Figure 1 is a side elevation of my improvement as in use, the well-tube or casing being shown in section. Fig. 2 is a detail perspective view of the lifting device. Fig. 3 is a detail section drawn alongside the cross-bolt of the clevis of the lifting device. Fig. 4 is a detail cross-section on about line 4 4 of Fig. 3. Fig. 5 is a detail perspective view of the holding or detent device for holding the rod while the lifting device is being readjusted for a fresh hold. Fig. 6 is a perspective view, and Fig 7 a side elevation, of a lifting device for engaging with the rod within the well-tube, the latter being shown in section; and Fig. 8 is a detail cross-section of the ring or bail used in the construction shown in Figs. 6 and 7.

As shown in Fig. 1, the holding device is supported at the upper end of the well-tube A and includes a lever B and a bail C, the latter embracing the rod $a$ and being pivoted at C' to the lever B, the latter having a crank-like projection B' to bind against the tube A, and so by the bail C clamp the rod $a$ tightly and prevent the rod from dropping when the lifting device, presently described, is being moved down the rod for a fresh hold, as well as to hold the rods at other times when desired.

The lifting device is of a special construction, as best shown in Fig. 2, and includes a pair of main bars D, a draft device at one end thereof, and a dog E at the other end of the bars, said dog being pivoted at one end at $d$ between the lower ends of the bars D and having its outer or free end at $e$ formed to bite against the rod $a$, preferably by serrating the curved face $e$, as shown. A bail F engages the opposite side of the rod $a$ from that engaged by the dog E, and the ends of such bail are pivoted at $f$ at its ends to the dog E at about the middle of said dog, as shown in Figs. 1 and 2.

The draft device at the upper end of the main bars D is arranged on the opposite side of the rod $a$ from the dog E and includes a clevis or hanger G and a cross-bolt H, connecting said clevis with the upper ends of the main bars, a tube I, encircling the bolt H between the bars D, spacing the same apart and also operating as an antifriction-roller to prevent wear and friction in the movement of the draft device along the rod $a$. In operation when the line connected with the draft device is slackened, as in dotted lines, Fig. 1, the lifting device may be freely lowered along the rod $a$ to any desired point, while upward strain on such line will draw the draft device to the position shown in full lines, Fig. 1, causing the dog to bind the rod $a$ and clamp the same firmly within the bail F, so the rod can be lifted as desired.

In Figs. 6, 7, and 8 I illustrate a construction of lifting device which can be lowered into a well-tube to engage a rod below the upper end of such tube, as when rods come uncoupled or break. This construction includes a bar J, which may be connected at one end at J' by riveting to a rod-coupling or other suitable lifting device and has its other end sloped or beveled on its inner side to facilitate its passage alongside the upper end of a rod in the well-tube, and a bail K, pivoted at one end at K' to the bar J and toothed at K² to engage with the rod $a$, as shown in Figs. 6 and 7. This construction can be readily lowered into a well-tube to engage with a rod therein for lifting the same, as will be understood from Figs. 6 and 7.

Having thus described my invention, what I claim as new, and desire to secure by Letters Patent, is—

1. The rod-lifter herein described consisting of the lifting device composed of the main bars, the dog pivoted between said bars at the end of the latter and formed at its free end to bite against a rod, the bail to embrace a rod and pivoted at its ends to the dog between the ends of such dog, and the draft device at the upper ends of the main bars and composed of the clevis or hanger the bolt and the spacing-tube on the bolt between said bars, substantially as and for the purposes set forth.

2. A lifting device for rods comprising a pair of main bars to pass on opposite sides of a rod, a dog pivoted at one end between the lower ends of the bars and formed at its free end to bite against a rod, a bail to embrace a rod and pivoted at its ends to the dog between the ends of the latter, a cross connection at the upper ends of the bars, a draft device at the upper ends of the bars, the lifting device being free of obstructions between the lower ends of the bars and the cross connection whereby the main bars may be extended in use alongside of and past the rod to be lifted.

3. The rod-lifter herein described, consisting of the dog arranged at one end to bite against a rod, a bail pivoted to such dog and adapted to embrace a rod to be lifted, a pair of main bars pivoted at one end to the dog and made of such length relatively to said dog as to extend at their other ends on opposite sides of and to the side of a rod to be lifted opposite that against which the dog bites, a cross connection between such ends of the main bars, and a lifting device connected with such ends of the main bars, all arranged and adapted for use substantially as and for the purposes set forth.

4. The combination of main bars, a dog and its bail at the lower end of said bars and a clevis or hanger, a bolt, and a spacing-tube on said bolt between the main bars at the upper ends of the latter.

5. A lifting device comprising a pair of main bars to extend on opposite sides of a rod, a dog pivoted at one end between the lower ends of said bars, a bail to embrace a rod and pivoted at one end to the dog midway between the ends of the latter, a bolt connecting the upper ends of the main bars, a spacing-tube on said bolt between the main bars, and a clevis connected with said bolt.

6. The herein-described lifting device comprising a pair of main bars to pass on opposite sides of a rod to be lifted, a cross connection between the upper ends of said main bars, to bear on one side of the rod to be lifted, a dog pivoted between the lower ends of the bars and arranged to bear against the opposite side of the rod to be lifted from the cross connection at the upper ends of the main bars, and a bail to embrace such rod and pivoted at its ends to the dog between the ends of the latter.

THOMAS HENRY TREGELLAS.

Witnesses:
SAMSON LIBBY,
J. F. MAYNARD.